United States Patent [19]

Trzaskos

[11] Patent Number: 5,389,848
[45] Date of Patent: Feb. 14, 1995

[54] HYBRID ULTRASONIC TRANSDUCER

[75] Inventor: Casmir R. Trzaskos, Amsterdam, N.Y.

[73] Assignee: General Electric Company, Schenectady, N.Y.

[21] Appl. No.: 6,274

[22] Filed: Jan. 15, 1993

[51] Int. Cl.⁶ ............................................ H01L 41/08
[52] U.S. Cl. .................................. 310/322; 310/334; 310/800; 310/327; 367/158; 367/165
[58] Field of Search ................. 73/632, 644; 310/322, 310/326, 327, 334, 336, 337, 800; 367/158, 165

[56] References Cited

U.S. PATENT DOCUMENTS

| | | | |
|---|---|---|---|
| 4,354,132 | 10/1982 | Borburgh et al. | 310/800 |
| 4,356,422 | 10/1982 | van Maanen | 310/800 |
| 4,382,201 | 5/1983 | Trzaskos | 310/327 |
| 4,383,194 | 5/1983 | Ohigashi et al. | 310/800 |
| 4,427,912 | 1/1984 | Bui et al. | 310/800 |
| 4,737,939 | 4/1988 | Ricketts | 310/800 |
| 5,166,573 | 11/1992 | Brown | 310/800 |

Primary Examiner—Hezron E. Williams
Assistant Examiner—Rose M. Finley
Attorney, Agent, or Firm—Paul R. Webb, II

[57] ABSTRACT

An ultrasonic transducer employed for both transmitting ultrasonic acoustic energy into an immersion medium and for detecting acoustic energy reflected from an object under examination is provided, the transducer having a hybrid transmitter and receiver in which a ceramic piezoelectric material is used to construct a first piezoelectric element for transmitting the acoustic energy, and a polymer piezoelectric material is used to fabricate a second piezoelectric element for receiving the reflected acoustic energy. The hybrid ultrasonic transducer provides improved performance over prior transducers using only a single ceramic piezoelectric element, in that the good transmitting properties of the ceramic are preserved, while the better receiving properties of the polymer piezoelectric are used to improve the sensitivity of the transducer. The polymer piezoelectric has the further advantage of providing a closer match of acoustic impedance to the immersion fluid used in the evaluation of objects.

16 Claims, 2 Drawing Sheets

HYBRID ULTRASONIC TRANSDUCER

BACKGROUND OF THE INVENTION

1. Field of the Invention

The present invention relates to ultrasonic transducers, and in particular to ultrasonic transducers suitable for use as immersion-type ultrasonic transducers used in quality control and flaw detector applications.

2. Description of the Related Art

Immersion-type ultrasonic transducers which are suitable for use in quality control and flaw detection applications are generally known in the art. One type of known ultrasonic transducer used in this service employs a single ceramic piezoelectric element contained in a housing, with the ceramic piezoelectric element being used to both transmit acoustic energy and to detect the reflected acoustic energy from the object undergoing evaluation. However, most piezoelectric materials heretofore used in these immersion-type ultrasonic transducers, including the aforenoted piezoelectric ceramic materials, are limited in their performance due to impedance mismatches between the transducer and the immersion medium, which is water in most cases. Further, while piezoelectric ceramics are generally regarded as having good acoustic energy transmissive properties, in converting electric energy pulses into sound energy, the piezoelectric ceramics perform relatively poorly in a receiving capacity, wherein sound wave pressures must be converted into a voltage by the material.

Polymeric piezoelectric materials are known to have a better impedance match with water than, for example, the ceramic piezoelectric materials, however the polymeric piezoelectrics are poor transmitters of acoustic energy. Polymeric piezoelectric materials do, however, work well as receivers or detectors of acoustic energy. Because of the poor transmission characteristics, the polymeric piezoelectric materials have seen only limited use in ultrasonic transducers. Principally, such materials have been used as dedicated receiver elements in systems which employ separate transmitter and receiver elements. The use of separate elements, however, results in a decrease in the accuracy of and/or an increase in the complexity of pinpointing the location of flaws in the item being inspected.

It is a principal object of the present invention to provide an ultrasonic transducer which includes within a single housing both a transmitter element having good acoustic energy transmitting properties and a receiver element having good acoustic energy receiving characteristics as well as an improved impedance match with an immersion medium.

It is another principal object of the present invention to provide an ultrasonic transducer which, within a single housing, takes advantage of the transmission properties of a ceramic piezoelectric, and which also takes advantage of the improved receiving properties and closer impedance match of the polymeric piezoelectric, thus eliminating or substantially reducing the problems heretofore associated with the less-than-desirable properties of each of these two material when used in ultrasonic transducers.

It is a further object of the present invention to employ both a ceramic piezoelectric material layer and a polymeric piezoelectric material layer as a transmitter means and a receiver means, respectively, in a transducer assembly which is packaged to have an external configuration which is substantially identical to a standard, known immersion-type transducer.

SUMMARY OF THE INVENTION

The above and other objects of the present invention are realized in an immersion-type ultrasonic transducer which employs, within a single housing, a piezoelectric material having good acoustic energy transmitting properties, such as a piezoelectric ceramic, as a transmitting element, and which employs a material having good acoustic energy receiving properties, such as a polyvinylidene difluoride (PVDF) polymer, or a copolymer of PVDF and trifluoroethylene, as a receiving element. The invention advantageously replaces a portion of the thickness of the conventional plastic or epoxy cover layer with the polymer piezoelectric material. As such, the transducer of the present invention will provide optimal transmitting and receiving characteristics in essentially the same external configuration of transducer packages known in the art.

In addition, one of the most commonly used immersion media is water, and a transducer which employs a PVDF receiving layer provides a better impedance match with water than would a transducer having only a ceramic transmitter/receiver, thus further improving the performance of the transducer.

BRIEF DESCRIPTION OF THE DRAWINGS

The above and other features of the present invention and the attendant advantages will be readily apparent to those having ordinary skill in the art, and the invention will be more easily understood from the following detailed description of the preferred embodiment of the present invention, taken in conjunction with the accompanying drawings, wherein like reference characters represent like parts throughout the several views and wherein.

DETAILED DESCRIPTION OF THE PREFERRED EMBODIMENT

Figure 1:
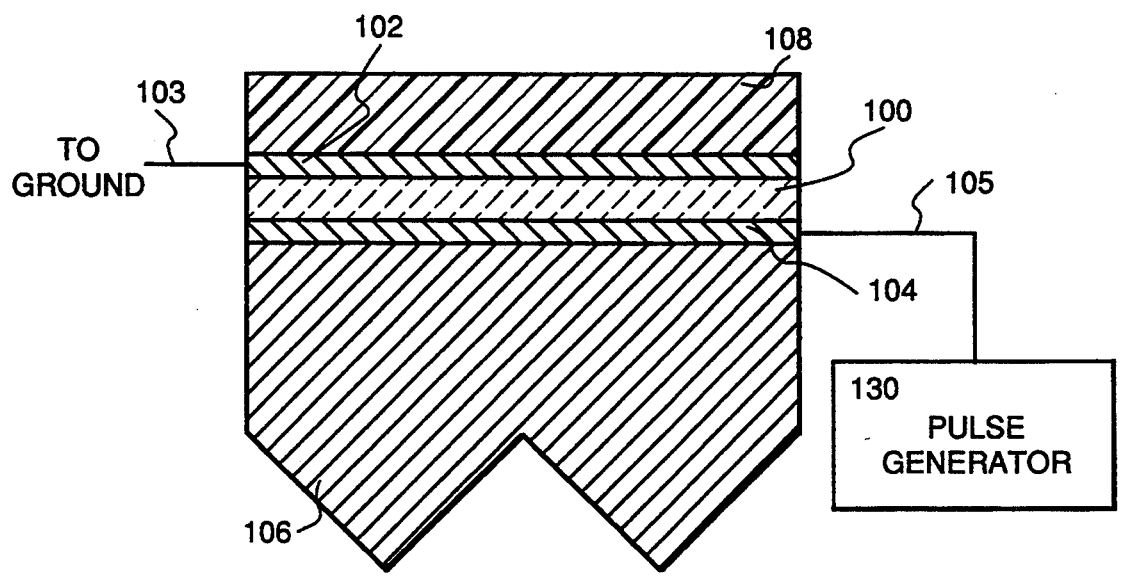
FIG. 1 is a cross-sectional schematic view of the operating components of a transducer as previously employed in the prior art.
Figure 2:
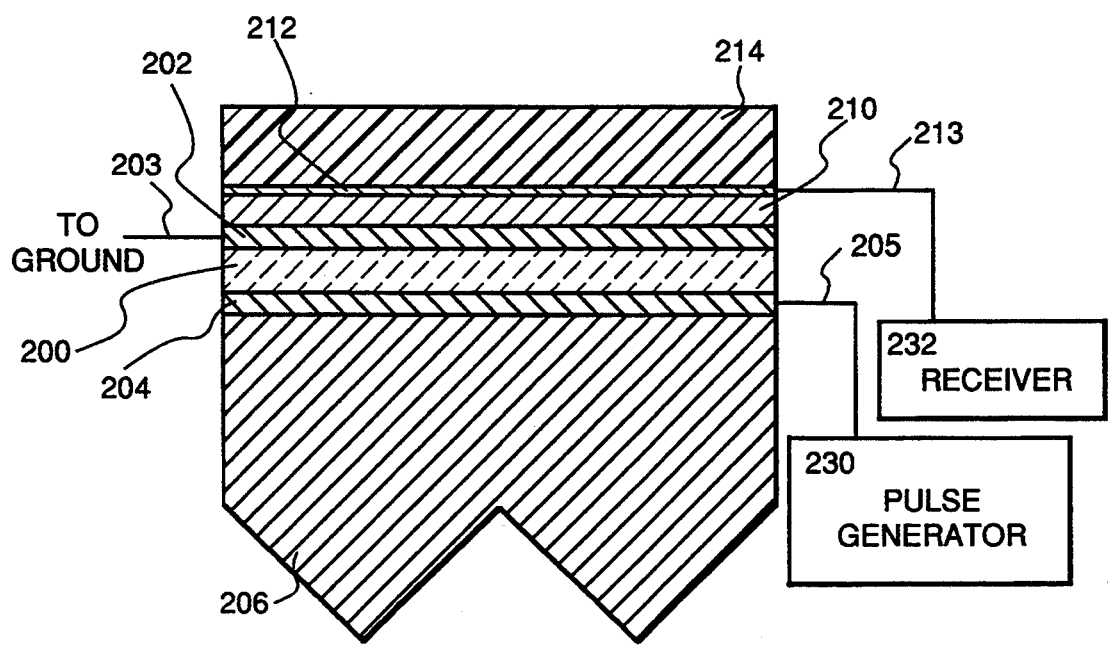
FIG. 2 is a cross-sectional schematic view of the operating components of a transducer in accordance with a preferred embodiment of the present invention
Figure 3:
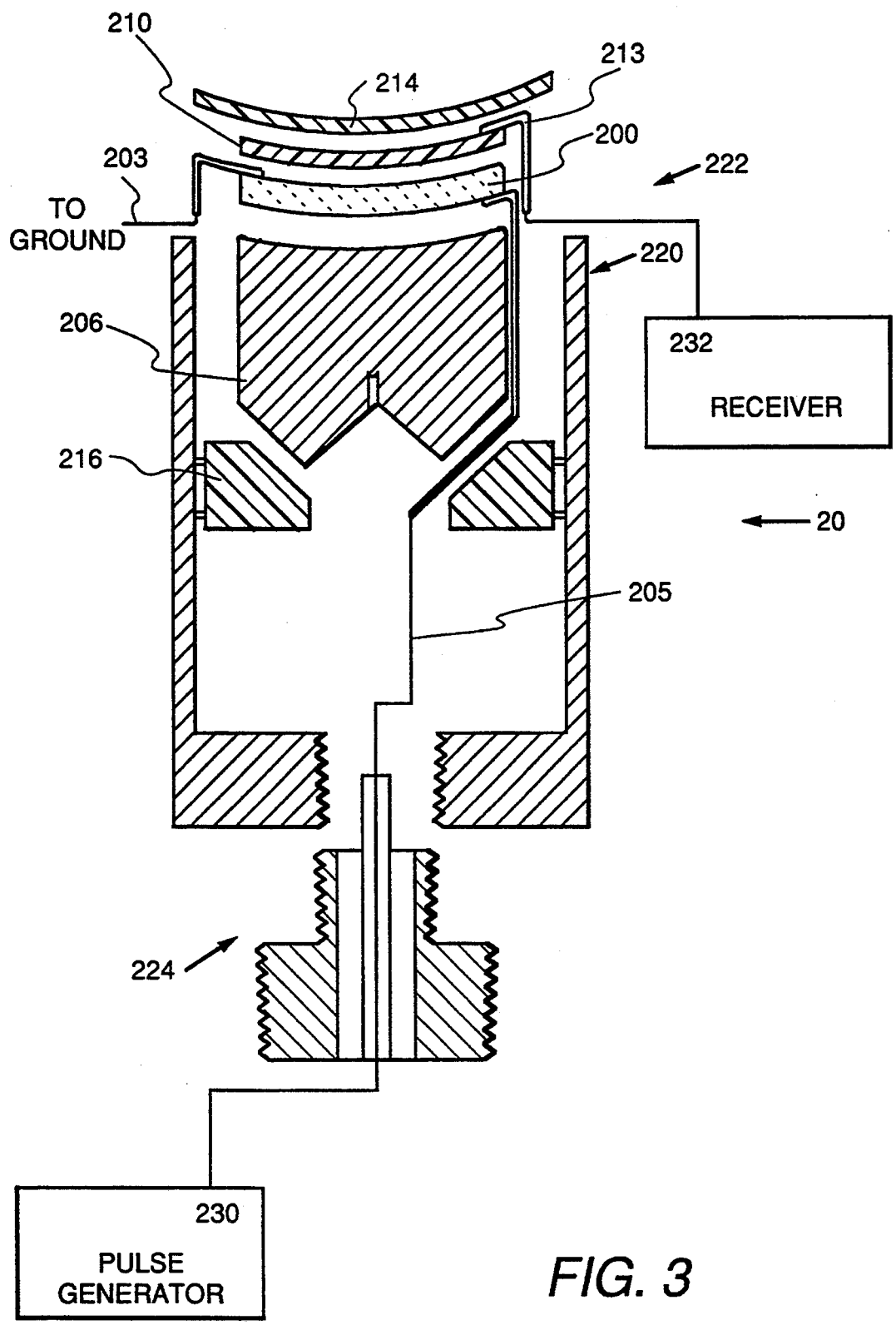
FIG. 3 depicts an exploded cross-sectional schematic view of a transducer prior to assembly into a casing, in accordance with the preferred embodiment of the present invention

FIG. 1 shows, in essentially schematic form, the construction of the internal transmitting and receiving components of an ultrasonic transducer in accordance with the prior art, and is presented to provide a point of reference for comparison to the structure according to a preferred embodiment of the present invention, as shown in FIGS. 2 and 3, and the attendant advantages of the invention. The prior art transducer employs a single piezoelectric element 100, typically a piezoelectric ceramic layer, as both the transmitter and receiver in the transducer. Prior to being assembled into a transducer case (see numeral 220, FIG. 3), the ceramic material will generally be subjected to a "poling" procedure, whereby the piezoelectric characteristics of the material are imparted to the material or the piezoelectric characteristics of the material are improved thereby. The ceramic piezoelectric element 100 also comprises electrodes 102, 104, formed on its upper and lower surfaces. The electrodes 102, 104 may advantageously be a deposited gold or platinum material. Each electrode has a lead or wire 103, 105 connected thereto, with one of the leads, shown in FIG. 1 as preferably being lead 105, being connected to a pulse generator means (box 130), and with the other lead 103 being connected to ground.

A lower surface of the element 100, i.e., the lower surface of lower electrode 104, is bonded to an energy-absorbent backing 106. The primary requirements of the backing 106 are that it have sufficient acoustic attenuation and that its acoustic impedance will provide an appropriate match with the acoustic impedance of the piezoelectric element. The attenuation must be high enough to reduce, to an insignificant level, the amplitude of any echoes formed in the backing, as is known in the art. Further, the level of impedance of the backing, when operating the transducer at a frequency of 5 or 10 MHz, for example, which are common operating frequencies for immersion-type transducers used in flaw detection, should preferably be in the range of 80 to 85% of the element impedance. One material known to be suitable for use as the backing member is a tungsten-vinyl composite.

An epoxy cover layer 108 is cast onto the exposed surface of upper electrode 102 at the side of the piezoelectric element 100 opposite the side of the element which is bonded to the backing. The cover layer 108 may advantageously be case after the piezoelectric element 100 and the backing 106 are mounted in a transducer case of the type shown by numeral 220 in FIG. 3. The epoxy cover layer serves to protect the active piezoelectric ceramic element and to improve the acoustic coupling between the piezoelectric ceramic element and water. The thickness of the cover layer 108 is commonly adjusted to a final thickness as part of the manufacturing process, in order to optimize the resolution and operating frequency of the transducer.

As noted previously, prior art transducers of this type employ the ceramic piezoelectric element as both a transmitter and a receiver. The transmitting function is achieved when the piezoelectric element 100 is excited electrically by sending an electrical pulse to one of the electrodes formed on the surface of the element, whereupon the piezoelectric characteristics of the material cause the element to emit acoustic energy. In the device shown in FIG. 1, the pulse generator means 130 would send a pulse through lead 105 to electrode 104. The same piezoelectric element is also used to detect acoustic energy reflected from an object undergoing examination, and to generate a corresponding electrical signal. The efficiency of such a transducer is less than optimal, in that the piezoelectric ceramic material has poor receiving properties as compared with certain other piezoelectric materials. Further, the ceramic material provides a poor impedance match to that of the immersion fluid, particularly when water is to be used as the immersion fluid.

Turning now to FIGS. 2 and 3, the ultrasonic transducer 20 in accordance with the present invention will now be described. FIG. 2 depicts schematically only the piezoelectric element subassembly of the transducer, whereas FIG. 3 is provided to show how these components are assembled into a transducer casing similar to or identical to those previously employed in the art.

The transducer according to a preferred embodiment of the present invention employs a first piezoelectric element 200, generally provided in layer form, with upper and lower electrodes 202, 204, preferably made of gold or platinum, formed on the upper and lower surfaces of the element 200. The lower electrode 204 is preferably connected to a pulse generator means, shown in block diagram form as 230, by wire or lead 205. The upper electrode 202 is preferably connected to ground via wire or lead 203.

This first piezoelectric element 200 is to be made of a material having good properties for transmitting acoustic energy, so that ultrasonic waves can be efficiently propagated into an immersion medium. An important indicator of a material's acoustic transmission properties is its piezoelectric constant $d_{33}$. The piezoelectric ceramics previously used in known transducers have relatively high $d_{33}$ values, and would generally be suitable for use as the first piezoelectric element 200.

A particularly suitable material which can be employed as the first piezoelectric element or transmitter means 200 is a Pb-modified sodium niobate ($NaNbO_3$) material marketed by General Electric Company, the assignee of the present application, under the trademark SONEX. The SONEX ceramic has a piezoelectric constant $d_{33}$ which is on the order of $60 \times 10^{-12}$ C/N, putting it into a class of material which would be considered to be good acoustic transmitters. One especially advantageous property of SONEX, as compared with other known piezoelectric ceramics, is that it has a relatively lower acoustical impedance, in the range of approximately $20-26 \times 10^5$ gm/sec-cm$^3$. Other piezoelectric ceramics generally have acoustic impedance of $30 \times 10^5$ gm/sec-cm$^3$ and higher. Thus, SONEX provides a closer match to the acoustic impedance of water, which is the most widely used immersion medium.

The transducer 20 is also provided with an energy absorbent backing 206, much in the same manner as in the FIG. 1 embodiment. The required characteristics for the backing will, to a large extent, be similar to those required in the previously-known transducer devices.

The present invention differs from known transducer constructions in that a second piezoelectric element 210 is provided. The material from which the second piezoelectric element is constructed is preferably selected to have material properties which complement the material properties of the first piezoelectric element 200. The term "complement" is used in the sense that, while the first piezoelectric element is preferably a ceramic material and thus possesses properties which yield poor or marginal acoustic energy receiving characteristics in a transducer, particularly in an immersion-type transducer, the material selected for the second piezoelectric element will have properties which improve the receiving properties of the transducer over those which would exist in a transducer in which only a ceramic element were provided, as is the case with known transducers.

Specifically, it is recognized in the present invention that two of the major disadvantages in a transducer having only a ceramic piezoelectric element are that the properties of the ceramic make it a relatively poor receiver material in ultrasonic transducer applications, and that the ceramic has a large impedance mismatch with immersion fluids, particularly with water. The second piezoelectric element is therefore preferably a material which provides good acoustic receiving characteristics, and which provides a more close impedance match to immersion fluids.

Polyvinylidene difluoride (PVDF) is one example of a piezoelectric polymer which has the desired properties of being an efficient converter of acoustic pressure from reflected ultrasound waves into a voltage which can be measured in an analyzer, and of having a much closer impedance match to water than can be obtained with a piezoelectric ceramic. Even more preferable than the PVDF polymer, particularly from a manufacturing standpoint, is a copolymer of PVDF and trifluoroethylene, preferably in the ration of 75% PVDF to 5% trifluoroethylene, hereafter referred to as a PVDF copolymer. It has been discovered that the PVDF copolymer has the advantage that a film of that material need not be stretched as part of the "poling" procedure in rendering the material piezoelectric, as does the film of PVDF. Further, the PVDF copolymer can more easily be made in greater film thicknesses, with the properties of the material remaining substantially uniform.

Second piezoelectric element 210 is preferably provided in layer form, and is advantageously bonded to upper electrode 202 of the first piezoelectric element 200. When the transducer is constructed in this manner, with electrode 202 connected to ground lead 203, the second piezoelectric element 210 also uses electrode 202 as its connection to ground. Second piezoelectric element 210 thus requires only one additional electrode as a signal electrode 212, to which signal lead 213 is connected.

Because the second piezoelectric element 210 is preferably made of PVDF or PVDF copolymer having an acoustic impedance more closely matched to the $1.5 \times 10^5$ gm/sec-cm$^2$ acoustic impedance of water, it can effectively replace a portion of the thickness of the epoxy cover layer which has been employed on known transducers. Stated another way, the second piezoelectric element 210 may be considered as forming a portion of the cover layer, while an epoxy cover layer 214, of reduced thickness as compared with known transducers, forms another portion of the cover layer of the transducer. The epoxy layer 214, which can preferably be a mylar layer, is provided in the present invention primarily to isolate the second piezoelectric element 210, and the other components housed in case 220 (FIG. 3), from the immersion medium.

In operation, an electrical pulse is sent by pulse generator means 230, through lead 205, to electrode 204 disposed at the underside of first piezoelectric element 200. The piezoelectric characteristics of first element 200, a piezoelectric ceramic in the preferred embodiment, cause the element to emit acoustic energy. The acoustic energy reflected from the object under examination is detected by the second piezoelectric element 210, which, as noted previously is selected to provide an efficient conversion of acoustic pressure into a voltage, and element 210 produces a voltage or signal which is passed by way of signal electrode 212 and signal lead 213 to a receiver 232 of a known type which is capable of interpreting the voltage signal to determine the presence or absence of flaws within the object under evaluation.

FIG. 3 is an exploded schematic view of the first and second piezoelectric element as they would be assembled into a transducer case 220. It is to be noted that, for simplicity, FIG. 3 does not depict the electrodes as separate components disposed on the upper and lower surfaces of the piezoelectric elements.

It is also to be noted that FIG. 3 shows the first and second piezoelectric elements 200, 210 as being spherically curved layers, with the epoxy cover layer 214 and the upper surface of the absorbent backing 206 further being shown as curved in the same manner as are the piezoelectric elements. When the piezoelectric elements are curved in the depicted manner, the transducer is of the type referred to in the art as a focused transducer. A focused transducer generally has increased sensitivity over a planar-type transducer, such as would be constructed using the planar elements of FIG. 2, and thus a focused transducer may be preferred for many applications.

The transducer 20 is preferably assembled by preparing a subassembly in which the first piezoelectric element 200 is bonded to backing 206, and the second piezoelectric element 210 is bonded to the upper surface of the first element 200. The various leads 203, 205, 213 will also preferably be bonded to their respective electrodes as preliminary steps in the process of bonding the layered piezoelectric elements 200, 210 to backing 206. Although leads 203 and 213 are not shown as extending through the case 220 to their respective connections, it will be readily understood that the housing and mountings for the piezoelectric elements can be made to permit the wiring to be installed through the interior of the case, as is schematically represented with respect to lead 205.

Once the backing and piezoelectric elements are bonded together, this subassembly is mounted into case 220. As shown in FIG. 3, a mounting means 216, made of a high-loss epoxy, attached to the inner wall of case 220 is adapted to provide a seating surface for the bottom portion of absorbent backing 206. Once the backing/piezoelectric element subassembly is mounted in the case, the protective outer epoxy cover layer 214 is preferably cast over the upper surface of the second piezoelectric element 210, such that the cover layer 214 extends across the entire opening at the distal end 222 of the transducer. The thickness of the cover layer is preferably selected to provide optimum response characteristics, as is generally known in the art. Other transducer components, such as the connector 224, will preferably be of a type known in the art, and as an example may be a standard RF connector.

As noted previously, the second piezoelectric element 210, whose acoustic impedance will be more closely matched to that of the immersion medium than will the acoustic impedance of the first piezoelectric element 200, can effectively replace a portion of the thickness of a cover layer which would normally be employed in a known transducer employing a single piezoelectric ceramic element as both the transmitting means and the receiving means. An optimum thickness of a cover layer for an immersion-type ultrasonic transducer having a single piezoelectric ceramic element is typically on the order of about 100 to 200 microns ($10^{-6}$m). Thus, the combined thickness of the second piezoelectric element 210 and the epoxy cover layer 214 is preferably approximately on the same order of magnitude. Because the sensitivity of the second piezoelectric element 214 as a receiving means increases proportionally to its thickness, it is preferred that the thickness of the second piezoelectric element be maximized at the sacrifice of cover layer thickness. In general, it is desired that the thickness of the second piezoelectric element 210 be about 40 microns or greater.

One practical limitation on the thickness of the second piezoelectric element 210 may be that the uniformity and consistency of the material properties of the piezoelectric material may not be adequate at greater thicknesses. This is believed to be much less of a problem when the PVDF copolymer (PVDF and trifluoroethylene) is employed for the second piezoelectric element 210, as its material properties in thicker layers have been demonstrated to be more uniform and consistent than the properties of thick layers of PVDF alone.

The ultrasonic transducer of the present invention may further employ components which are known in the art, but which are not depicted in FIGS. 2 and 3. For example, it is known to use shunt resistors for the piezoelectric element, in order to provide additional electrical damping which limits the ring down time of the transducer. It is expected that transducers made in accordance with the present invention will preferably include such shunt resistors for the first and second piezoelectric elements.

An experimental model was constructed substantially in accordance with FIG. 3, wherein the first piezoelectric layer was a SONEX ceramic having platinum electrodes on either side, the second piezoelectric element 210 was made of a 40-micron thick PVDF material with a gold electrode on an upper side, and the epoxy cover layer 214 comprised a 125-micron thick Mylar material. Thus, the use of a PVDF second piezoelectric element was demonstrated to provide improved receiving capabilities over those which would be present in a transducer having a single piezoelectric ceramic element as both transmitter and receiver.

It is to be understood and recognized that the foregoing detailed description of the present invention is given merely by way of illustration, and that modifications and variations may become apparent to those skilled in the art, which modifications and variations do not depart from the spirit and scope of the invention. Accordingly, the scope of the present invention is to be determined by reference to the appended claims.

What is claimed is:

1. An ultrasonic transducer comprising:
   transmitter means for emitting ultrasonic acoustic energy, said transmitter means comprising a first piezoelectric element made of a piezoelectric ceramic material and having opposing upper and lower surfaces;
   receiver means for detecting acoustic energy reflected from an object under evaluation, said receiver means comprising a second piezoelectric element made of a piezoelectric polymer material and having upper and lower surfaces;
   first and second electrodes, respectively positioned in abutting relationship with said lower surface of said first piezoelectric element, and said upper surface of said second piezoelectric element
   means for coupling said first electrode to a signal pulse generator;
   means for coupling said second electrode to a signal receiver;
   a common electrode positioned in abutting relation with both said upper surface of said first element, and said lower surface of said second element; and
   means for establishing a single continuous conductive path between said common electrode and an electrical ground.

2. An ultrasonic transducer as recited in claim 1, wherein said common electrode is positioned between said first and second piezoelectric elements.

3. An ultrasonic transducer as recited in claim 2, wherein said piezoelectric ceramic material is a Pb-modified sodium niobate.

4. An ultrasonic transducer as recited in claim 1, wherein said piezoelectric polymer material comprises polyvinylidene difluoride (PVDF).

5. An ultrasonic transducer as recited in claim 1, wherein said piezoelectric polymer material is a copolymer of PVDF and trifluoroethylene.

6. An ultrasonic transducer as recited in claim 1, wherein said first piezoelectric element is formed as a layer.

7. An ultrasonic transducer as recited in claim 6, wherein said second piezoelectric element is formed as a layer.

8. An ultrasonic transducer as recited in claim 7, further comprising an epoxy cover layer disposed on said second electrode abutting said second piezoelectric element.

9. An ultrasonic transducer as recited in claim 8, further comprising an absorbent backing bonded to a lower surface of said first electrode abutting said first piezoelectric element.

10. An ultrasonic transducer as recited in claim 9, wherein said first piezoelectric element layer and said second piezoelectric element layer are spherically curved.

11. An ultrasonic transducer as recited in claim 8, wherein said piezoelectric polymer material comprises polyvinylidene difluoride (PVDF).

12. An ultrasonic transducer as recited in claim 11, wherein said piezoelectric polymer material is a copolymer of PVDF and trifluoroethylene.

13. An ultrasonic transducer as recited in claim 11, wherein a combined thickness of said second piezoelectric element layer and said epoxy cover layer is on the order of 100–200 microns.

14. An ultrasonic transducer as recited in claim 1, wherein:
    said transmitter means and said receiver means are housed within a single transducer case.

15. An ultrasonic transducer as recited in claim 14, further comprising an epoxy cover layer disposed on said second piezoelectric element and extending completely across an opening at a distal end of said transducer case, said cover functioning to isolate said first piezoelectric element and said second piezoelectric element from an external environment.

16. An ultrasonic transducer as recited in claim 15, wherein a thickness of said second piezoelectric element is about 40 microns or greater.

* * * * *